Nov. 14, 1967   R. K. REYNOLDS   3,352,565
SERVOMECHANISM AND VEHICLE SUSPENSION EMPLOYING SAME
Filed April 28, 1965   7 Sheets-Sheet 1

FIG. 1.

Inventor:
Ralph K. Reynolds
By John W. Gaines
Atty.

Nov. 14, 1967  R. K. REYNOLDS  3,352,565
SERVOMECHANISM AND VEHICLE SUSPENSION EMPLOYING SAME
Filed April 28, 1965  7 Sheets-Sheet 4

Inventor:
Ralph K. Reynolds
By John W. Gaines
Atty.

United States Patent Office 3,352,565
Patented Nov. 14, 1967

3,352,565
SERVOMECHANISM AND VEHICLE SUSPENSION EMPLOYING SAME
Ralph K. Reynolds, Saratoga, Calif., assignor to International Harvester Company, a corporation of Delaware
Filed Apr. 28, 1965, Ser. No. 451,405
19 Claims. (Cl. 280—6)

The application relates to a vehicle having an adjustable hydropneumatic suspension, and particularly relates to a servomechanism controlling the suspensions so as to provide adjustment of the height and ground clearance of the vehicle as desired.

My invention has primary application to, but is not limited thereto, a track-laying vehicle for carrying a heavy instrumentality on the body such as a gun and turret, a digging instrument for heavy earthworking or agricultural purposes, or the like. In the illustrative example herein disclosed, the set of support means for the front portion of the vehicle consists of two wheels on each side, and individual actuators interconnecting those four wheels and the body of the vehicle. One set of wheels at the rear consists of three tandem arranged left rear wheels, and the other set at the rear consists of three tandem arranged right rear wheels.

The wheels of each of the rear sets have similar individual actuators, and the wheels of all three sets are of the track type and are hydraulically bogied in each set, that is, the actuators of each set are hydraulically interconnected and hence the wheels equalize the load among one another in that set.

The front wheels distribute the load of the front of the vehicle about a ground reference midpoint through which the resultant front center force vector of ground reaction acts, such point being midway force-and-aft between the front wheels and midway side-to-side between the front wheels. The left rear wheels distribute the vehicle weight adjacent the left rear corner about a ground reference midpoint through which the resultant force vector of ground reaction acts. The right rear wheels distribute the right rear corner load of the vehicle about a ground reference midpoint through which the resultant force vector of ground reaction acts.

It is apparent that through control of the front center set and control of the rear sets of wheels relative to the front center set, the vehicle body can be pitched about a transverse axis by controlling the front center set of wheels, or by controlling the rear sets of wheels, or by changing the height of the front set in one direction and the rear set in the opposite direction. Tilting of the vehicle about a longitudinal axis is accomplished by moving one rear set of wheels in one vertical direction and moving the other rear set of wheels in the opposite direction. Finally, coordinated upward movement of the three sets of wheels, or coordinated downward movement, appropriately changes the general height of the vehicle body to a desired elevation.

From the foregoing, it is apparent that a vehicle according to my invention has considerable versatility in operation because of its multi-condition suspension system. The suspension adjusts the body so that it is high when negotiating very rough terrain requiring high ground clearance. Reducing the height, when smoother terrain is encountered, allows the vehicle to expose a low operating silhouette. The pitching and tilting property allows the vehicle to be raised or lowered at the appropriate portions to bring the instrument carried by the vehicle into absolutely level relation. For use under parked conditions, I provide mechanical locks on the four corner suspensions of the vehicle to prevent vertical movement of the actuators and thus the body provides a stable platform for the instrument as long as the vehicle remains parked.

Preferably, the actuator of only one wheel in each set has a control device whereby that set of wheels sets the general height of the portion of the vehicle body supported by such wheels. The heart of the control device according to my invention comprises a follow-up mechanism for causing one shaft member of a pair of coaxial shaft members to operate in accordance with the second one. The mechanism more specifically comprises: telescopically related valve rotor parts associated with, and connected to different ones of, the shaft members, the valve parts having fluid-directing grooves and ports for selectively applying pressure fluid from a high-pressure source or exhausting pressure fluid to a low-pressure source; power means comprising one rotary actuator and connected to move the one shaft member and the associated valve rotor part to duplicate the motion of, and take a corresponding position to, the second shaft member and its associated rotor part, the one shaft member forming part of one wheel suspension means and interconnecting the rotor actuator and a wheel of that one suspension means; means operatively affording the wheel suspension means to be at hold, or to have raise motion, or a lower motion, comprising first interconnecting hydraulic circuit means including the high-pressure source, portions of the fluid-directing grooves and ports, and said actuator wherein, in a first relative operational position of the valve parts, high pressure is applied in a direction causing one motion of the suspension means; and second interconnecting hydraulic circuit means including the low pressure source, portions of the fluid-directing grooves and ports, and the actuator wherein, in a second relative operational position of the valve parts, low pressure is exhausted in a direction affording opposite motion of the one suspension means.

As the actuator aforesaid in each such set of wheels has movement under the fluid pressure applied or exhausted by the valve parts, the other actuator means in the set duplicate the movement on a hydraulically load-equalized basis, because in accordance with my invention the other actuator means are connected in circuit parallelly with one another and with the actuator aforesaid, and in circuit serially with the valve parts and each source.

Three adjustment levers are grouped together to provide for height, pitch, and tilt according to my invention, each connected to a different one of the second shaft members whereby shift of a front center lever between extreme opposite operating positions causes the front suspensions to move the adjacent portion of the vehicle body between raise and lower positions, whereby shift of a left rear lever between extreme opposite operating positions causes the left rear suspensions to move the left corner portion into body raise and body lower positions, and whereby shift of a right rear lever between extreme opposite operating positions causes the right rear suspensions to move the right corner portion between body raise and body lower positions. Hence, the body can be changed to maintain precise stability, and the vehicle driver sets the attitude from an effective triangulation of points representing the respective resultant ground reference points.

Further features, objects and advantages will either be specifically pointed out or become apparent when, for a better understanding of the invention, reference is made to the following written description taken in conjunction with the accompanying drawings which show a preferred embodiment thereof, and in which:

FIGURES 9–17 are transverse sectional views through the valving wherein, generally, FIGURES 9, 10, and 11 show the valve parts and suspension in their rotatable relation approaching the extreme body raise position, of which FIGURE 11 thereof produces the flow illustrated in FIGURE 7 preceding; wherein FIGURES 12, 13, and 14 show the valve parts and suspension rotatably related to produce a body hold position intermediate the extreme positions; and wherein FIGURES 15, 16, and 17 are taken along the section lines XV—XV, XVI—XVI, and XVII—XVII of FIGURE 2, and with the valve parts and suspension shown in their rotatable relation approaching the extreme body lower position;

Figure 1:
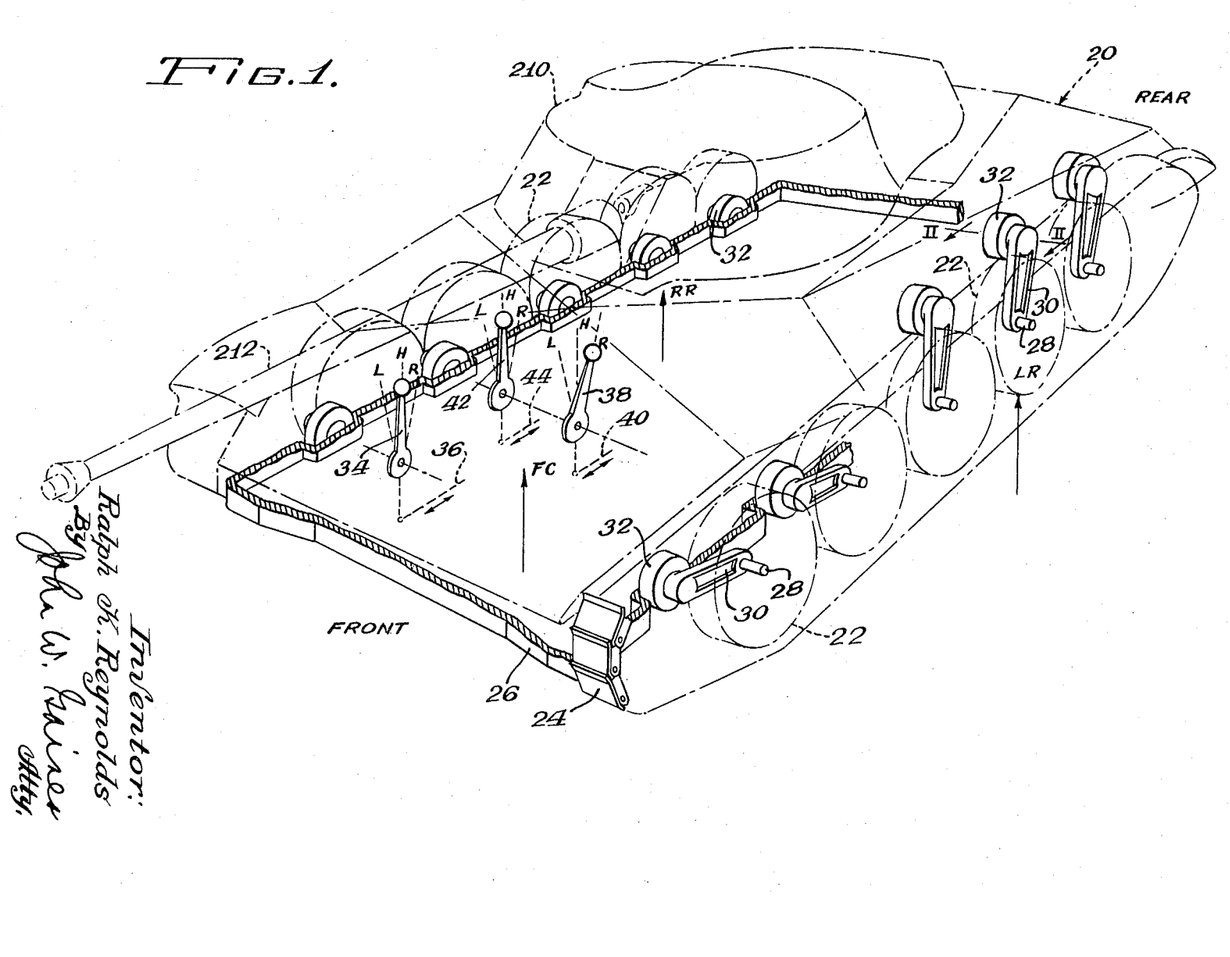
FIGURE 1 is a phantom isometric view of a military tank embodying my adjustable hydropneumatic suspension invention.

A military tank 20 is shown in FIGURE 1 having a plurality of bolt-on hydropneumatic wheel suspension units. Each suspension unit includes a bogie wheel 22 which rides upon a ground-engaging crawler track 24, and which is mounted for movement in a generally vertical direction with respect to the body 26 of the vehicle by means of a wheel bearing spindle 28. The spindle 28 is fixed at the end of a roadarm 30 which swings up and down in a longitudinal vertical plane. As shown, the tank is equipped with the suspension units in the standard number of ten, but in practice the number can be varied as desired and is not any limitation on the present invention.

Each roadarm 30 is journalled for rocking movement on a transverse fixed axis in a rotary hydraulic actuator 32. The actuators 32 are hydraulically bogied in sets in an arrangement whereby the front four wheels 22 of the vehicle operate in unison, the three left rear wheel 22 vehicle operation in unison, the three left rear wheels 22 operate in unison. The resultant reaction points of the ground to the front set, to the left rear set, and to the right rear set of wheels are at the head of the respective vertically acting vectors indicated at FC, LR, and RR, respectively.

Elevation of the front center portion of the body 26 is controlled along the axis of the vector FC by means of a pivoted front control lever 34 having a linkage or cable 36 interconnecting the lever and valving, not shown, so as to operate the actuators 32 of the front set of wheel suspensions. A control lever 38 on the left as viewed by the operator has a linkage or cable 40 interconnecting the left lever 38 and valving, not shown, for controlling the body level along the axis of vector LR relative to the left rear wheels 22. A right control lever 42 has a linkage or cable 44 interconnecting the lever and valving, not shown, for controlling the right rear wheels 22.

The operative positions of the remote control levers 34, 38 and 42 indicated by abbreviations in FIGURE 1 are for lower body, hold body, and raise body, respectively. From the raise body position shown in solid lines for the lever 38, the cable 40 is movable only in a rearward direction inasmuch as the lever is in an extreme position.

Figure 2:
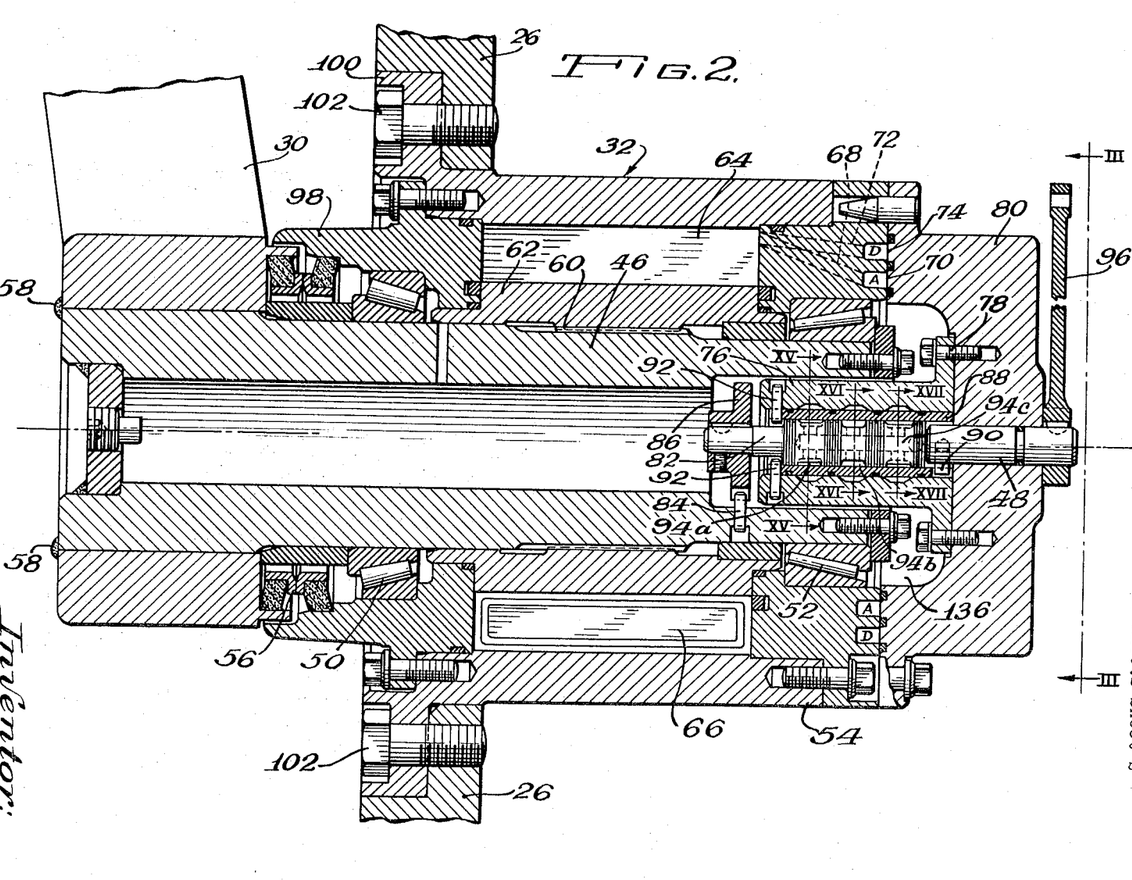
FIGURE 2 is a rear elevational view in longitudinal section taken along the lines II—II of FIGURE 1, and taken with accuracy except that the actuator is shown after having moved the roadarm into a position inclining upwardly and away from the viewer in FIGURE 2.

In FIGURE 2, a first shaft 46 which is the output shaft of the actuator 32 is arranged therewithin so as to duplicate the movements of a second or dictator shaft 48 which provides the input setting. The first shaft 46 is journalled is tapered roller bearings 50 and 52 in a servo-actuator housing 54, so as to rotate on a fixed axis which is coaxial with the second shaft 48. Adjacent its outer end, the first shaft 46 is sealed by a rotary seal 56 between that end and the adjacent end of the housing 54, and that end of the shaft 46 has a protruding extremity and an associated roadarm 30 secured thereto by welding 58.

A portion of the first shaft 46 intermediate the opposite ends thereof has a splined connection 60 which carries the rotor 62 of the rotary actuator 32. One fixed abutment 64 of a pair of diametrically opposed abutments within an annular chamber of the actuator provides a stationary stop within the housing 54. Two diametrically opposed vanes on the rotor 62, one appearing at 66, respond to fluid pressure within the annular chamber and the rotor 62 applies drive torque to rock the first shaft 46. Each vane 66 has an individual actuator passage 68 communicating between the working chamber at one side of that vane and an annular actuator groove 70 formed in the housing 54. A fixed drain passage 72 communicates with the opposite or non pressure side of each vane and connects it to an annular drain groove 74 formed in the housing 54.

A fixed stator case 76 of a rotary control valve is secured by bolts 78 to a stationary inner end cover 80 for the housing 54. The stator case 76 projects into a counterbored recess in the open inner end of the hollow first shaft 46. A follower spool 82 forms an inner rotor part within the valve. An inwardly directed, radial pin 84 carried by the shaft 46 and a wheel 86 fast to the spool 82 form a mechanical interconnection between the shaft 46 and spool 82 so that they turn at all times in unison.

A motion-dictating sleeve 88 forms an outer rotor member in the valve and is between the stator case 76 and the follower spool 82. A slot and pin 90 form a mechanical interconnection between the second shaft 48 and the sleeve 88 so that they rotate in unison. The sleeve 88 and the pin 90 of the interconnection prevent inward withdrawal movement of the valve rotor parts in the direction of the cover 80. A pair of radially disposed pins 92 carried by the stator case 76 prevents outward axial movement of the sleeve 88 and follower spool 82.

The rotary control valve is divided into three sections consisting of an actuator section 94b in the middle, a drain section 94a at the outer end, and a pressure section 94c at the inner end. The second shaft 48 establishes the angularity of the motion-dictating sleeve 88 under control of a lever 96 which is fast to the dictator shaft 48 and which is operated by a remote control, not shown.

The servo-actuator housing 54 has a wide mouth which carries an outer end cover 98 that closes the actuator chamber and also seals and journals the outer end of the first shaft 46. The vehicle body 26 has a counterbored circular opening to which a heavy circular flange 100 on the housing 54 is secured by a plurality of large bolts 102. Removal of those bolts 102 allows the entire wheel suspension including the actuator 32 to be removed from the vehicle, provided the hydraulic and cable connections are disconnected.

In each set of suspensions, only one actuator 32 is a servo-actuator in fact, due to having a rotary valve. Valves in the other actuators are omitted because the valve in the servo-actuator operates all actuators in a set of suspensions.

Figure 3:
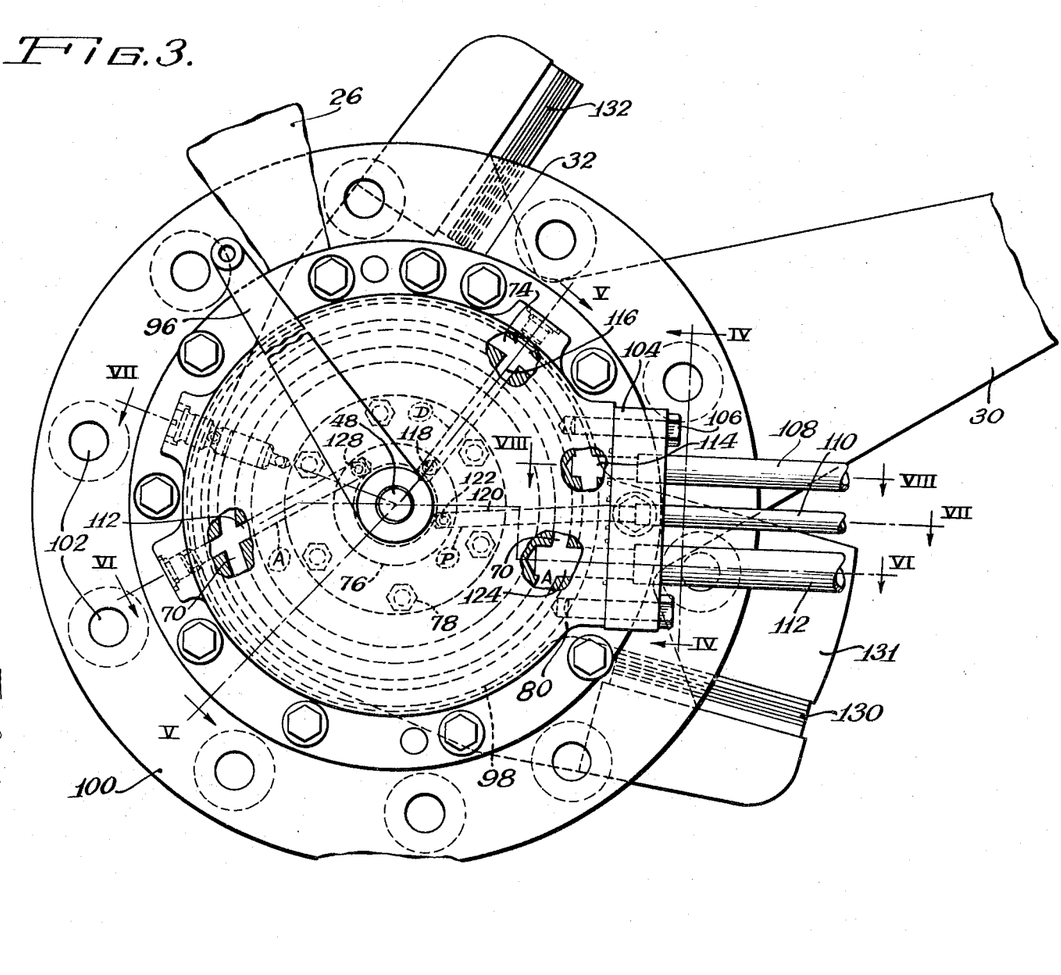
FIGURE 3 is an elevational showing as viewed outwardly from the inner end of the actuator in the direction of the arrows III—III of FIGURE 2, and with the height setting lever which appears in the upper left foreground being shown in true position, whereas the upright position illustrated in FIGURE 2 is slightly out of the corresponding true position.

In FIGURE 3 in which the view is outwardly in the axial direction of the actuator 32, a rectangular adapter fitting 104 is on the side, and is secured by four bolts 106 to the inner end cover 80 of the housing and carries fluid connections consisting of a discharge conduit 108, a pressure conduit 110, and an actuator conduit 112. The drain conduit 108, which drains the rotary valve and the non pressure chambers in the actuator, is connected by an axially extending passage 114 (FIGURE 8) in the cover 80 to the annular drain groove 74. The drain groove 74 is in turn connected by a passage 116 (FIGURE 5) in the cover 80 to an axial passage 118 in the stator case 76 (FIGURES 3 and 5) leading from the drain section 94a of the rotary control valve.

The abbreviation generally shown applied to the drain passages indicates their function.

In FIGURE 3, the pressure conduit 110 communicates in a path leading through a cover passage 120, an axial passage 122 in the valve stator case 76 (FIGURES 3 and 7), and the valve pressure section 94c, thence into the valve actuator section 94b which constantly communicates with the annular groove 70 and the actuator or working chambers of the actuator.

The abbreviation generally shown applied to the pressure passages indicates their function.

The actuator conduit 112 communicates in a path through a generally radially extending passage 124 in the cover 80, the actuator groove 70 in the housing 54, another actuator conduit or passage likewise designated 112 (FIGURE 6), a generally axially extending inlet-outlet passage 128 in the valve stator case 76, the valve actuator section 94b, and thence leads either to the drain section 94a of the valve which communicates with the drain, or leads from the pressure section 94c of the valve which communicates with a high pressure source.

The abbreviation generally shown applied to the actuator passages indicates their function.

In FIGURE 3, the outer head 98 of each actuator 32 presents a generally horizontal, radially extending, fixed stop 131 which intervenes in the path of rotation of upper and lower stop pads 130 and 132. The pads 130 and 132 define an included angle of approximately 120°, and are carried by side lugs integral with, and disposed one on each side of, the roadarm, 30. Upward rocking of the arm 30 on wheel jounce is limited as shown in FIGURE 3 due to engagement between the lower pad 30 and the underside of the stop 31. In one physically constructed embodiment of the invention, the arm 30 was so limited when it had attained an inclination of 21°30′, and the depending limit of angularity was 15° below horizontal, being limited by engagement of the upper pad 132 with the top of the stop 131.

Figure 4:
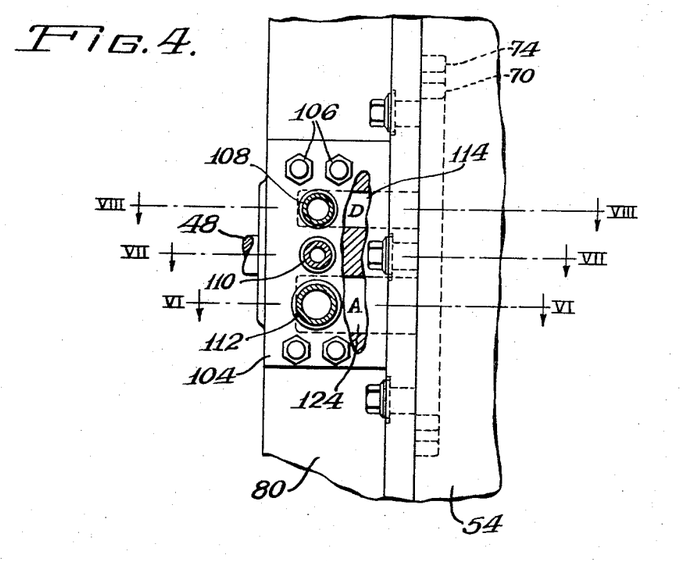
FIGURES 4, 5, 6, 7, and 8 show details of the valving and associated internal passages taken along the respective section lines IV—IV, V—V, VI—VI, VII—VII, and VIII—VIII of FIGURE 3, the valving being slightly differently adjusted in successive views to effect fluid flow in the directions shown in that view.

In FIGURE 4, the axial drain passage 114 leading from the drain groove 74 is connected so as to discharge the exhausted and drained liquid directly into the drain conduit 108. The axially extending actuator passage 124 is connected to the actuator conduit 112 and, by means of the latter, all actuators and their actuator grooves 70 constantly intercommunicate with one another.

Figure 5:
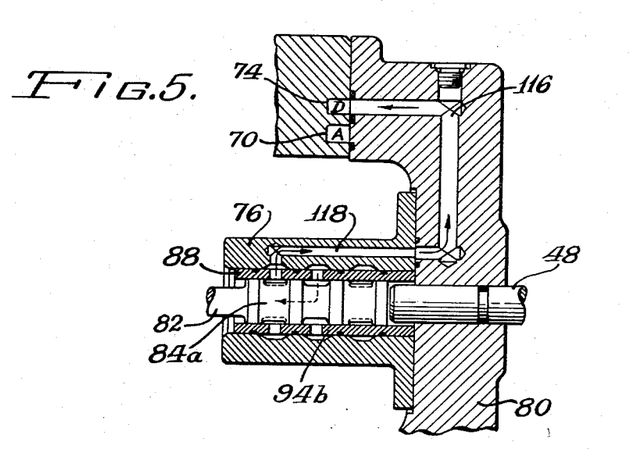
Figure 8:
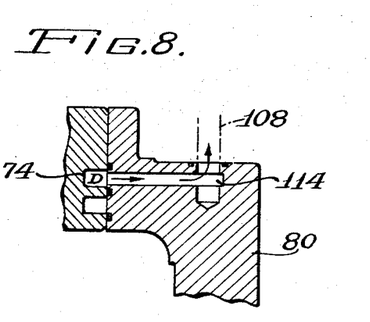

In FIGURES 5 and 8, the drain groove 74 receives and retransmits drain liquid in the path shown by the single headed arrows in those respective figures. More specifically, the outer end drain section 94a of the rotary control valve controls the back pressure on the middle actuator section 94b which constantly communicates with the working chamber of the actuator. When this pressure is released by opening the outer end drain section 94a, the liquid escapes from the actuator into the drain groove 74. Thence, the liquid is introduced into the drain conduit 108 for return to reservoir.

Figure 6:
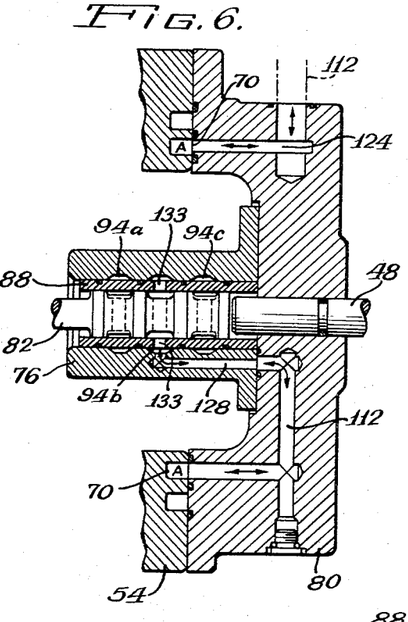

In FIGURE 6, the middle actuator section 94b communicates in a path leading to and from the working chambers of the actuators, including permanently open ports 133 in the sleeve 88, and the intervening communications including the passages and conduit 112 connected both to all actuators in a set and to the actuator groove 70 of each such actuator.

Figure 7:
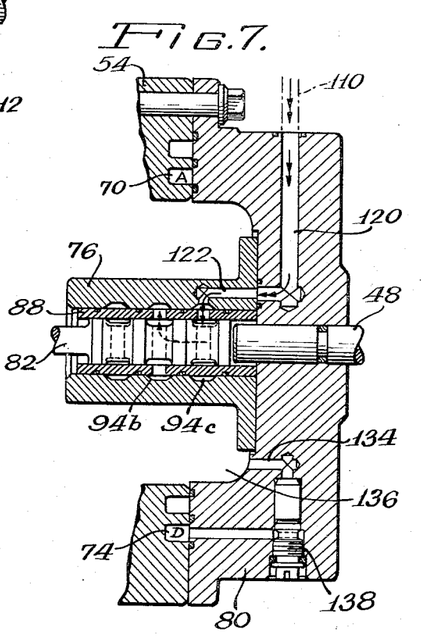

In FIGURE 7, the pressure fluid admitted into the middle actuator section 94b is controlled by the inner end pressure section 94c of the valve, the path of flow being indicated by the double headed arrows and including the pressure conduit 110, the radial passage 120, and the axial passage 122 in the stator case 56 of the valve. A bearing lube oil chamber 136 defined within the housing 54 collects oil for the roadarm shaft bearings, not shown, and returns it to the drain groove 74 and to drain in a path which includes a head cover passage 134, in which there is interposed a lightly spring loaded valve 138 which opens at or above one or two p.s.i. to permit essentially free flow of drain oil from the chamber 136.

Figure 9:
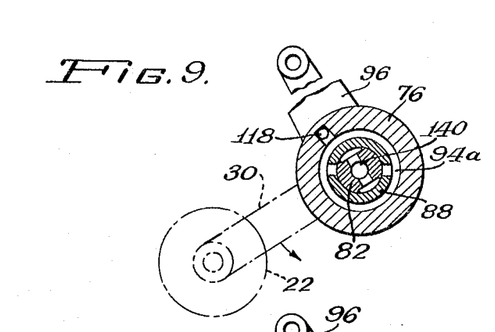
Figure 10:
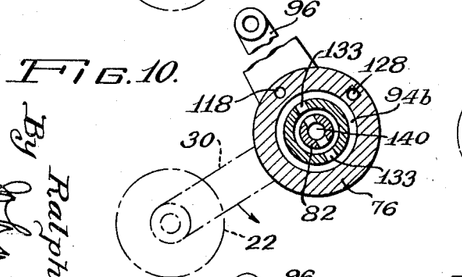
Figures 11, 14:
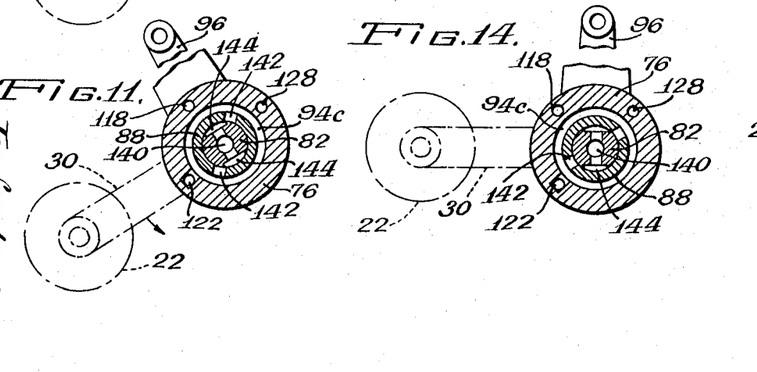

In the FIGURES 9, 10 and 11 which are transverse views of the rotary valve through the respective outer end drain section 94a, middle actuator section 94b, and inner end pressure section 94c, it can be seen that the middle section has constant communication with the end sections by means of a through bore 140 in the follower spool 82. The spool 82 and the outer rotor part are rotatably related so that the roadarm 30 has a corresponding position making predetermined final movement to complete the extreme body raise condition. The road wheel 22 has exaggerated smallness so that it can appear in the cross sectional valve views. The rotor parts 82 and 88 in FIGURE 9 are in mutually blocking relation, preventing escape to drain of the actuator fluid in the bore 140 common to the sections 94a and 94b. In FIGURE 11, the dictator sleeve 88 is held by the lever 96 so that ports 142 formed in the sleeve have the angularity shown. The follow-up spool 82 has the counterclockwise direction of rotation of the roadarm 30 as indicated by an arrow, and continues rotation so long as pressure fluid from the ports 142 enters grooves 144 defined by lands on the spool 82. Movement stops when the lands of spool 82 completely block the ports 142, thus stopping the introduction of pressure fluid into the through bore 140 feeding the actuator section 94b of the valve.

Figure 12:
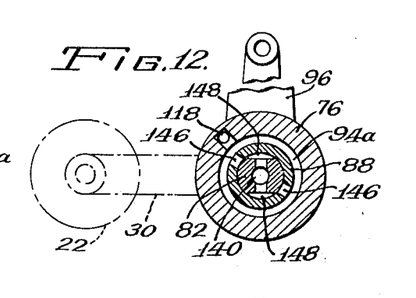
Figure 13:
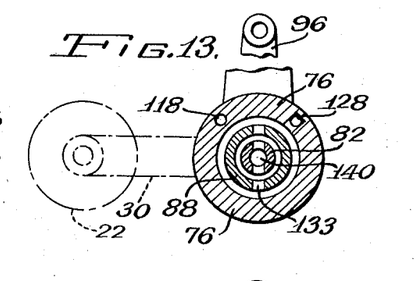

One satisfied position of the valve rotor parts is illustrated in FIGURES 12, 13 and 14, the roadarm 30 being specifically shown in the center or neutral position although it is maintained in any angle of inclination or dependency desired whenever the rotor parts are in satisfied position. Specifically in FIGURE 12, the lands of the inner rotor part 82 block ports 146 formed in the outer rotor part, preventing fluid from draining between grooves 148 defined by the lands and the ports in the outer end drain section 94a. A similar blocking situation is illustrated in the pressure section 94c shown in FIGURE 14, in which fluid under pressure in the ports 142 of the outer rotor part is prevented by the lands on the inner rotor part 82 from entering the through bore 140. There is hence no transfer of fluid to or from the actuators through the middle actuator section 94b shown in FIGURE 13 and the roadarm 30 tends to remain static.

Figure 15:
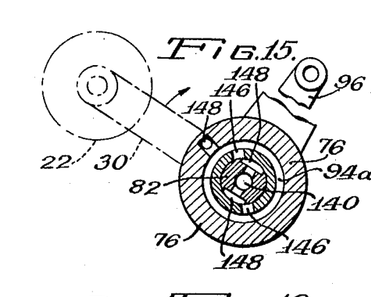
Figure 16:
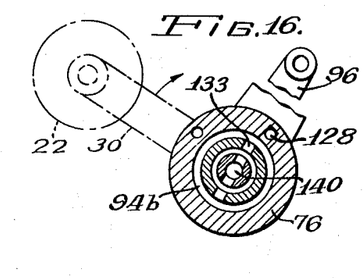
Figure 17:
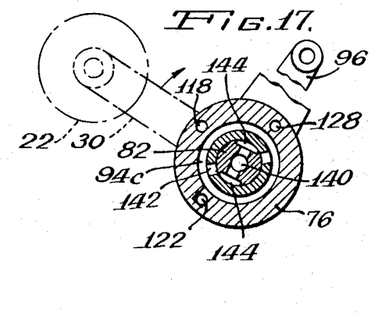

In FIGURES 15, 16, and 17 in which the roadarm 30 is shown in a position making predetermined final movement to complete the extreme body lower condition, the lands on the inner rotor part 82 are moving clockwise as shown by the arrow in a direction to close the drain ports 146 of section 94a (FIGURE 15), and continued movement blocks the escape of fluid from the spool grooves 148 attempting to drain through the ports 146. Motion stops when the ports 146 are completely blocked. In FIGURE 17, the pressure supplied ports 142 of the outer rotor part remain covered by the lands on the inner rotor part 82 and, consequently, the spool grooves 144 and through bore 140 are blocked from receiving pressure fluid.

In the various satisfied positions of the rotary valve such as the one shown in FIGURES 12, 13 and 14, predetermined initial rotary movement disturbing the spool 82 in either direction connects a set of the grooves thereon with a companion set of ports in the associated outer rotor part 88. Pressure in the actuator working chambers is appropriately applied or exhausted, so that the pressure liquid will always flow in a direction to cause the roadarm 30 to be restored to its initial or undisturbed position. Additionally, a pneumatic restoring force is applied in opposition to wheel jounce loads by means of accumulators connected to the actuators in a manner hereinafter described.

Each actuator, in a first or servo class of the actuators for controlling the sets of wheels, is provided with a rotary valve in the manner referred to. A second class of actuators on the vehicle has no such valve and no further structure. There is no pressure conduit 110 leading to actuators of the second class and no interconnecting passages 120 or 122 (FIGURE 7) to supply input fluid under pressure for such a valve.

Figure 18:
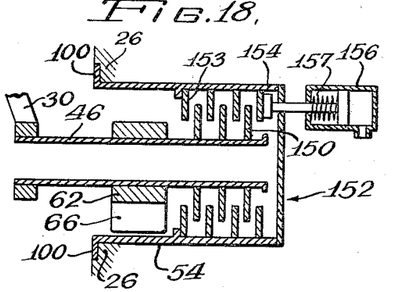
FIGURE 18 shows another form of the actuator appearing in preceding FIGURE 2, the view being similarly taken in longitudinal section but being merely schematic.

In actuators of a third class, illustrated in FIGURE 18, the rotary valve and the pressure conduit 110 are likewise omitted, but further structure is provided for locking the actuators. The roadarm connected output shaft 46 has an inner extension passing through appropriate seal means and a bearing, not shown, and carrying the movable inner disks or plates 150 of a multiple disk brake splined thereto. Braking elements of known type are suitable, for example, stacked friction plates of a more conventional type such as generally disclosed in U.S. Patents No. 1,819,855, No. 1,921,951, No. 2,169,850, and No. 3,047,283 or, in some cases, suspension arm brake elements of a specialized type such as disclosed in FIGURES 9 and 10 of U.S. Patent No. 2,714,517.

More particularly, the disk brake as schematically shown and generally designated 152, is formed in a cylindrical extension 154 of the actuator housing 54 which carries fixed outer brake plates 153 that are intercalated with the inner plates 150. A hydraulic cylinder schematically indicated at 156 applies axial outward pressure so as to collapse a brake release spring 157 and the sets of plates, frictionally locking the output shaft 46 and the roadarm 30 from movement so that the associated wheel cannot be displaced vertically. The mode of employing the various classes of actuators, along with the overall operation of the vehicle suspension, will now be explained.

Figure 19:
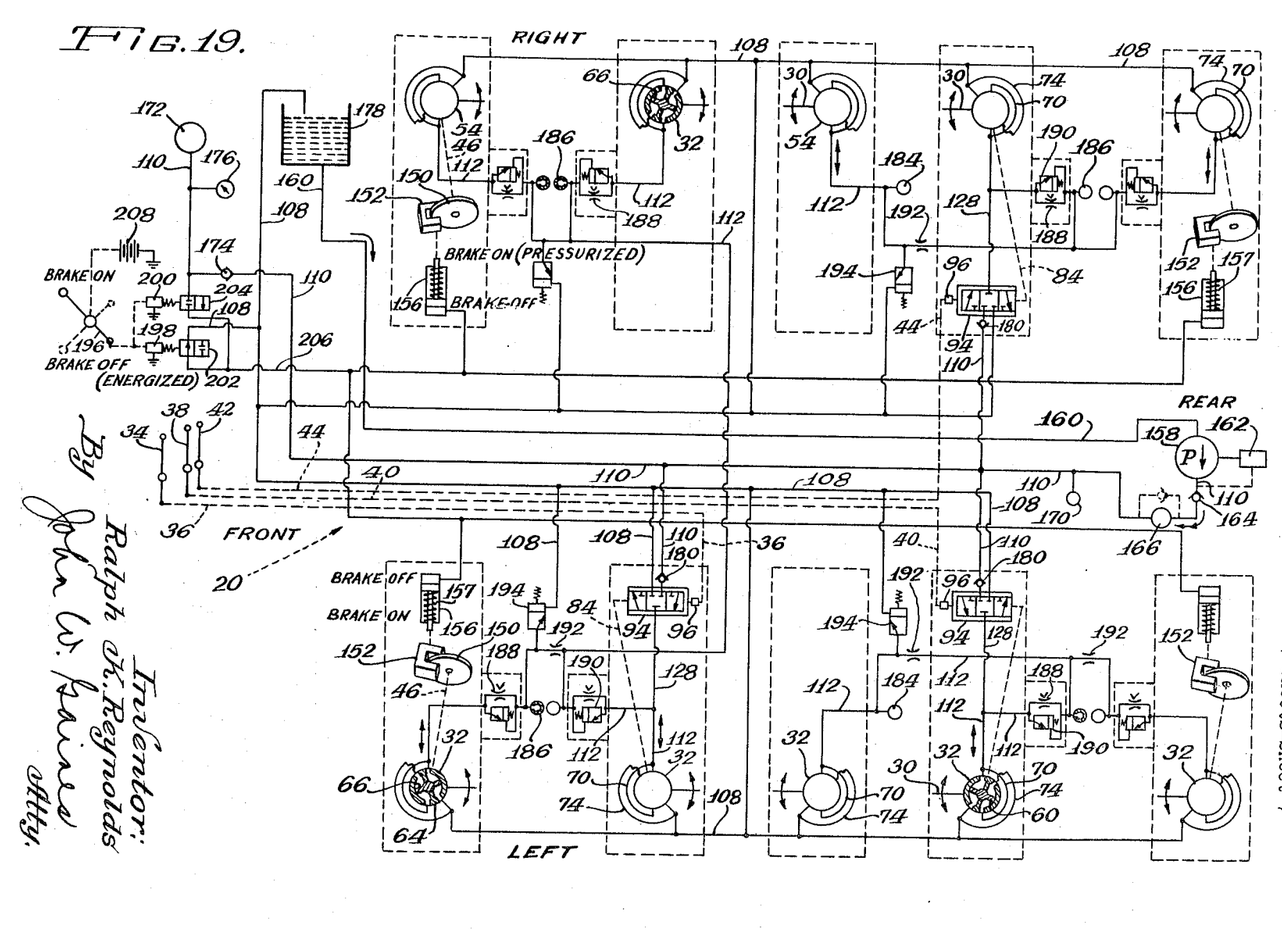
FIGURE 19 is a schematic view of the overall hydraulic control circuit for the vehicle suspensions.

In FIGURE 19, the ten suspension units are individually enclosed in broken line rectangles. There are four actuators of the third class including disk brakes 152, disposed one at each of the respective four corners of the military tank 20.

The actuators 32 which are next adjacent to three of the four corner actuators are three actuators of the first class, having the rotary valves indicated by the general notation 94, interconnecting each of those three actuators with a pressure line 110 leading from a pump 158. The remaining three actuators 32 are of the second class, having no brake 152 and having no valve 94.

The pump 158 is connected between a pump suction conduit 160 and the pressure conduit 110. A pressure compensator 162 is connected in bypass relation to the pump 158.

The pump delivers high-pressure hydraulic fluid into the line 110 in a path including a one-way valve 164 and a high-pressure filter 166. The filter is bypassed by a spring-loaded one-way valve 168, the valve serving as a relief valve and opening only when the filter becomes plugged.

In a portion of the end of the pressure conduit 110 immediately downstream of the pump and the filter 166, an accumulator 170 is connected in the conduit, and at the extreme opposite end of the pressure conduit 110 another accumulator 172 is connected in the conduit. Connected in the conduit 110 adjacent the accumulator 172 are a one-way valve 174 and a pressure gauge 176. An oil reservoir 178 is connected between the drain conduit 108 and the pump suction conduit 160 so as to supply the pump with liquid.

The rotary control valves 94 are shown in a schematic developed view for simplification. One rotor part, i.e., the follow-up spool in each rotary valve 94, is mechanically connected by the pin connection 84 to the adjacent actuator 32. The other rotor part, i.e., the dictator sleeve, is operated by the lever 96, there being three levers 96 each controlled by a different one of the respective hand control levers 34, 38, and 42, respectively.

The two middlemost actuators 32 of the tank vehicle 20 have only an individual spring loaded or pneumatic accumulator 184 connected in the conduit 112 between each such actuator and the associated rotary valve 94. Each of the other actuators not only includes a similar individual wheel accumulator indicated at 186 in the conduit between the valve and actuator, but also an interposed surge means. The surge means consists of a variable restriction orifice 188 connected in parallel with a damper-type relief valve 190. Shock hydraulic loads from the actuator thus pass through the surge means in order to enter the accumulator 186 in the actuator conduit 112.

The inlet-outlet passage 128 of the rotary valve 94 for each set of wheels handles the transfer of all fluid to and from the actuators 32 of that set. Thus the inlet-outlet passage 128 of each rotary valve, which depends upon direction of fluid flow for its function, is a fluid supplying passage when in a first interconnecting circuit applying pressure fluid in a path from a branch 110 of the pressure conduit, through a check valve 180, the rotary valve, and the actuator conduit 112, thence to the appropriate one of the actuators 32. The passage 128 is a fluid exhausting passage when in a second interconnecting circuit exhausting fluid from the actuators 32 and actuator conduit 112 to the rotary valve and drain conduit 108. The wheel accumulators 184 and 186 have conduit branches which interconnect them and their respective actuators and which can be considered a third interconnecting hydraulic circuit. The third circuit is, in any case, connected to the inlet-outlet passage 128 and conduit 112 at a point so as to share, with the first and second circuits, that portion of the conduit 112 which leads from that point to the respective actuator. The wheel accumulators are free from interference by any action of the rotary valves 94, and vice versa, because they are hydraulically in parallel therewith.

So as to keep a local road shock on one wheel from disturbing the others, the individual actuators 32 of a set of suspension units are hydraulically isolated to a minor extent from one another by means of interposed fixed restrictors 192 in the actuator conduit 112. Relief valves 194 are connected between the actuator conduit 112 and different drain branch conduits 108 leading into the reservoir 178.

In FIGURE 19, the disk brakes 152 by which the suspensions at the four corners of the tank vehicle 20 are locked solid are operated by means of a brake switch 196 and two solenoids 198 and 200 which operate two respective solenoid valves 202 and 204. The valves 202 and 204 are connected at one side to the drain conduit 108 and to the pressure conduit 110, respectively, whereas at the other side they are connected in common by a conduit 206 to the head ends of the power brake cylinders 156. The solid line positions shown for the respective switch 196, solenoids 198 and 200, and valves 202 and 204 produce an electrically energized, hydraulically drained condition in which all of the brakes 152 are disengaged. The switch 196 is included in circuit with electrical source 208 for supplying the current flow.

Interruption of the circuit due to moving the switch 196 into the dotted line position shown, de-energizes the solenoids, enabling valve return springs to contract and pull the valves 202 and 204 simultaneously to the left as viewed in FIGURE 19. The previously open drain conduit 108 is blocked by the valve 202, and the previously closed pressure conduit 110 is opened by the valve 204 so as to introduce fluid into the brake conduit 206, applying pressure and causing the cylinders 156 to engage the four brakes 152. Brake release, by draining the brake cylinders 156, is accomplished by restoring the switch 196 to the current supplying position shown in solid lines in FIGURE 19. The brake release springs 157 expand and release the brakes, thus unlocking the suspensions.

The controlled suspension arrangement illustrated in FIGURE 19 is well suited for use in relatively heavy vehicles, and is of particular advantage in implement-carrying vehicles and other instrumentality-carrying vehicles such as tanks. The brakes 152 are kept disengaged while the vehicle is moving and a completely cushioned air ride or gas ride is effective. During high-speed operation over relatively smooth terrain, the three control levers 34, 38 and 42 are preferably kept at the same inclination in a hold condition maintaining a body lower attitude. The vehicle thus presents a low silhouette and high speed is normally attained without subjecting the suspension to bottoming during travel.

If there is danger of bottoming such as due to potholes or ridges, or if the terrain is of an exceptionally rough character necessitating high ground clearance, the levers are retracted into a central hold position or to a hold condition in a nearly complete or partial body raise position, depending upon the amount of height desired. Movement of the levers out of common inclination to one another causes the vehicle to continue with a pneumatically cushioned ride, but at a pitched or tilted attitude maintaining the plane of the body at some dihedral angle with respect to the plane of the ground. To alleviate discomfort during sustained running of the vehicle along the side of a ridge, for example, the driver by lowering the high side can tilt the vehicle body into a more nearly horizontal position for an easier ride.

Changing the plane of the body with respect to the plane of the ground is particularly advantageous when the vehicle is parked. Despite such nonuniformity as side grade, down grade, or up grade parking, the front and rear end portions of the vehicle can be trimmed level with one another, and the vehicle can also be leveled athwartwise. The disk brakes 152 (FIGURE 19) for locking the four corner suspensions are set in engagement by opening the switch 196, making the advantage particularly significant in a military gun-carrying vehicle wherein recoil may damage the vehicle if the gun is fired while the vehicle is supported on yieldable suspensions. In the case of such a vehicle having a revolvable turret 210 in which a gun 212 is mounted, such turret (FIGURE 1) can be leveled into the horizontal plane, and provides a stable platform because the suspension is braked rigidly while the gun is fired.

Following is an example of the specifications for a suspension such as the foregoing, capable of providing cushioned ride and rigidly parked conditions in a heavy vehicle:

| | |
|---|---|
| Pump 158 | Engine driven, piston type, 28.5 g.p.m. @ 2200 r.p.m. |
| Compensator 162 | Set to bypass at or above 3000 p.s.i. |
| Filter 166 | High pressure, 74 micron wire mesh. |
| Accumulator 170 | 50 cubic inch capacity, nitrogen precharge @ 1500–2200 p.s.i. |
| Relief valves 194 | Set to open at or above 6000 p.s.i. |
| Accumulators 184 | Volume nitrogen 120 cubic inches, volume oil 112 cubic inches, total 232 cubic inches, precharged. |
| Restrictors 192 | Optional; 0.130 inch orifice if provided. |
| Relief valve 190 | Adjustably set within range 0–8000 p.s.i., preferably 4000 p.s.i. |
| Adjustable restriction orifices 188 | Selected setting from group of ³⁄₃₂", ¹⁄₁₆", and 0.130" diameters. |
| Accumulator 172 | 50 cubic inch capacity, volumetric displacement 25.3 cubic inches at 1500 p.s.i. nitrogen precharge. |

Irrespective of their absolute angularity, when the inner and outer rotor parts in the valve sections 94a, 94b and 94c take the relative positions illustrated in FIGURES 12, 13 and 14, initial jounce movement of a wheel gives rise to dampening action of the surge means and cushioning action by the affected accumulator. After a slight predetermined initial movement, however, causing the follow-up spool 82 to rotate clockwise, the jounce motion brings into registration the edges of the grooves 144 and the ports 142 so as to connect the through bore 140 to pressure. This condition is illustrated in FIGURE 11 insofar as relative position of the inner and outer valve parts is concerned, although the absolute angularity of the parts in FIGURE 11 is not the best example of the condition being described. At that point, the cushioning effect of the accumulator and the pressure due to fresh fluid being introduced into the actuator under pressure, apply a joint restoring force to the set of wheels in question. On the other hand, if the vehicle is given added load, the actuators are automatically fed with additional fluid added to the actuator conduit, and the vehicle is restored to its original height.

Conversely if the vehicle is lightened by removal of load for example, the valve only is primarily affected, and each actuator in a progressively increasing manner is connected to drain. FIGURE 15 illustrates the relative position of the inner and outer valve rotor parts for draining the actuators, and the absolute angularity is in a specialized condition consistent with the one being described. Irrespective of pressurization or drain, the actuator is always operating the wheel in a direction restoring the valve parts to the neutralized or satisfied position of relative rotation but not necessarily the absolute angularity, as illustrated in FIGURES 12, 13 and 14.

What is claimed is:

1. In a multi-wheel vehicle having wheel suspension means, including rotary actuator means, connecting a plurality of the wheels to the vehicle body for sustaining the body in a desired attitude:
    shaft members carried by the vehicle, one member of which, with means associated therewith, forms an interconnecting structure in one of said wheel suspension means;
    a follow-up mechanism carried by the vehicle and connected to a plurality of the shaft members for causing said one shaft member to operate in accordance with a second one;
    said follow-up mechanism comprising telescopically related valve rotor parts associated with, and connected to different ones of, the shaft members; said valve parts in communication with high and low pressure fluid sources having fluid directing grooves and ports therein whereby said parts are effective for selectively applying pressure fluid from the high-pressure source or exhausting pressure fluid to the low-pressure source;
    power means in the follow up mechanism comprising a load sustaining, rotary actuator and connected to move with said one shaft member and the associated valve rotor part to duplicate the motion of, and take a corresponding position to, the second shaft member and its associated rotor part, said interconnecting structure formed by the one shaft member and its associated means in said one wheel suspension means interconnecting said rotary actuator and the track wheel of that suspension means;
    means hydraulically interconnecting the power means with, for controlled operation by, the valve parts; and
    means for rotating the second shaft member.

2. The invention of claim 1, wherein said shaft members, valve parts, and load sustaining rotary actuator are coaxial and self-contained in an individually removable suspension unit for the one wheel.

3. In a multi-wheel vehicle having wheel suspension means, including load sustaining rotary actuator means, connecting a plurality of the wheels to the vehicle body for sustaining the body in a desired attitude:

shaft members carried by the vehicle;

follow-up mechanism carried by the vehicle and connected to a plurality of the shaft members for causing one shaft member to operate in accordance with a second one;

said follow-up mechanism comprising telescopically related valve rotor parts associated with, and connected to different ones of, the shaft members; said valve parts in communication with high and low pressure fluid sources having fluid-directing grooves and ports therein whereby said parts are effective for selectively applying pressure fluid from the high-pressure source or exhausting pressure fluid to the low-pressure source;

power means in the follow-up mechanism comprising a rotary actuator and connected to move said one shaft member and the associated valve rotor part to duplicate the motion of, and take a corresponding position to, the second shaft member and its associated rotor part; said one shaft member forming a portion of one wheel suspension means and interconnecting said rotary actuator and a wheel of that one suspension means;

means operatively affording the one wheel suspension means to be at rest, or to have one motion or an opposite motion, comprising first interconnecting hydraulic circuit means including the high-pressure source, portions of the fluid-directing grooves and ports, and said actuator wherein, in a first relative operational position of the valve parts, high-pressure is applied in a direction causing one motion of the one suspension means; and second interconnecting hydraulic circuit means including the low-pressure source, portions of the fluid-directing-grooves and ports, and said actuator wherein, in a second relative operational position of the valve parts, low pressure is exhausted in a direction affording opposite motion of the one suspension means;

said first and second circuit means further including the other actuator means included in the suspension means for said plurality of wheels, in a manner whereby said other actuator means are connected in circuit parallelly with one another and with said actuator, and in a circuit serially with the valve parts and each source, so as to move simultaneously with, and in correspondence with, and hydraulically load equalized with, both the one motion of the one suspension means and the opposite motion of the one suspension means.

4. In a multi-wheel vehicle having wheel suspension means, including load sustaining rotary actuator means, connecting a plurality of the wheels to the vehicle body for sustaining the body in a desired attitude:

coaxial shafts carried by the vehicle, one of which, with means associated therewith, forms an interconnecting structure in one of said wheel suspension means;

rotary follow-up mechanism carried by the vehicle and connected to a plurality on the shafts for causing said one shaft to operate in accordance with a second one;

said follow-up mechanism comprising telescopically related valve rotor parts associated with, and connected to different ones of, the shaft members; said valve parts in communication with high and low pressure fluid sources having fluid-directing grooves and ports therein whereby said parts are effective for selectively applying pressure fluid from the high-pressure source or exhausting pressure fluid to the low-pressure source;

power means in the follow-up mechanism comprising a rotary actuator and connected to move said one shaft and the associated valve rotor part to duplicate the motion of, and take a corresponding position to, the second shaft and its associated rotor part; said interconnecting structure formed by the one shaft and its associated means in said one wheel suspension means interconnecting said rotary actuator and the track wheel of that one suspension means;

means operatively affording the wheel suspension means to be at hold, or to have raise motion or a lower motion, comprising first interconnecting hydraulic circuit means including the high-pressure source, portions of the fluid-directing grooves and ports, and said actuator wherein, in a first relative operational position of the valve parts, high pressure is applied in a direction causing one motion of the one suspension means;

and second interconnecting hydraulic circuit means including the low-pressure source, portions of the fluid-directing grooves and ports, and said actuator wherein, in a second relative operational position of the valve parts, low-pressure is exhausted in a direction affording opposite motion of the one suspension means.

5. The invention of claim 4, said suspension means mounting said plurality of wheels for movement in a generally vertical direction with respect to the body, said valve parts constituting a vehicle-attitude-setting rotary valve controlling such wheel movement;

accumulator chamber means having compressible means, and having third interconnecting hydraulic circuit means establishing communication between the compressible means in the accumulator chamber means and the actuator means to cushion such wheel movement;

said rotary valve being common to the first and second circuit means so that the latter share common conduit connected between said valve and actuator, said third circuit means having a junction to said common conduit at a point between the valve and actuator so that the first, second, and third circuit means share the common conduit between that point and the actuator.

6. In a ground vehicle for carrying an instrumentality, having a plurality of vertically movable support means supporting the vehicle body, hydraulic actuators interconnecting the body and each of said support means, said actuators being connected to a source of pressure fluid, and an instrumentality supported on the body of the ground vehicle:

selectively operable control means for the actuators comprising valve-controlled first means interconnecting the source and the actuators for yieldably resisting vertical movement of said support means and applying a restoring force to the same;

second means including a valve part (88) carried by the vehicle and connected to the first means for causing the first means to induce vertical movement of selected ones of the support means, whereby the instrumentality on the body may be vertically adjusted, pitched, or tilted relative to ground; and third means carried by said vehicle and connected to selected ones of said actuators for mechanically locking the support means against vertical movement after the body is vertically adjusted, pitched, or tilted to each degree desired.

7. A track-laying, ground vehicle for carrying an instrumentality on the vehicle body, comprising:

pluralities of track-type wheels for supporting the vehicle body and hydropneumatically operative in sets each consisting of at least a pair of wheels apiece;

hydraulic actuators interconnecting the body and the wheels for independent movement of the sets of wheels in a generally vertical direction with respect to the body;

fluid supply means constituting a low-pressure and a high-pressure source;

selectively operable control means for the actuators comprising adjustably settable first means interconnecting the source and the actuators for yieldably resisting vertical movement of said wheels and applying a restoring force to the same;

second means including operator-operable adjusting means carried by the vehicle and connected to the first means to adjust the settings thereof for causing the first means to induce vertical movement of selected ones of the wheels, whereby the instrumentality on the body may be vertically adjusted, pitched, or tilted relative to ground; and third means carried by the vehicle and connected to the actuators at the four corners of the vehicle for frictionally locking same so that the sets of individually movable wheels are no longer movable.

8. The invention of claim 7, characterized by:

said first means including pairs of valve forming rotor parts (94) and accumulators (184, 186) hydraulically connected in that order between the source (158, 178) and the actuators;

each pair of the rotor parts comprising companion follower and dictator rotor parts mechanically connected one (82) to an associated actuator (32) and one (83) to the second means (34, 38, or 42), respectively;

said third means comprising hydraulic brakes (152) having separate means (202, 204), separate from the first means, including pairs of valve forming parts and hydraulically interconnecting the source and the hydraulic brakes.

9. The invention of claim 8, the sets of wheels characterized by an infinitely variable height setting between extreme raise and extreme lower positions in their generally vertical direction of yieldable movement;

said rotor parts being operator-operable through the second means (34, 38, or 42) for causing the hydraulic actuator and the high and low pressure source to intercommunicate establishing the infinitely variable height setting between the extreme raise and extreme lower portions; and operator-operated means (196) connected to the separate means (202, 204) for causing the hydraulic brakes and the high and low pressure source to intercommunicate.

10. A track-laying, ground vehicle for carrying an instrumentality on the vehicle body, comprising:

pluralities of track-type wheels for supporting the vehicle body and hydropneumatically operative in sets each consisting of at least a pair of wheels apiece;

hydraulical actuators each having one shaft and interconnecting the body and the wheels for independent movement of at least three sets of the wheels in a generally vertical direction with respect to the body;

fluid supply means constituting a low-pressure and a high-pressure source;

first follow-up mechanism provided for a first set of the wheels including an assembly of one actuator shaft aforesaid and a second shaft and effective for causing the one shaft of the shaft assembly to operate in accordance with the second shaft, said first follow-up mechanism further comprising telescopically related valve rotor parts associated with, and connected to different ones of, the shafts; said valve parts in communication with the high and low pressure fluid sources and having fluid-directing grooves and ports therein whereby said parts are effective for selectively applying pressure fluid from the high-pressure source or exhausting pressure fluid to the low-pressure source;

second follow-up mechanism similar to the first mechanism and provided for a second set of the wheels;

third follow-up mechanism similar to the first follow-up mechanism and provided for a third set of the wheels;

means hydraulically interconnecting the respective actuators of the first, second, and third sets of wheels to, for controlled operation by, the respective first, second and third follow-up mechanism; and means for rotating the second shafts.

11. In a track-type vehicle including fluid under pressure supply means, said vehicle further including plural track-type wheels supporting the vehicle body and hydropneumatically operative in sets each consisting of at least a pair of wheels apiece, the combination comprising:

spindles mounting the track wheels for independent movement of the sets of wheels in a generally vertical direction with respect to the body;

power-operated road arm structure connected to the body, including hydraulic actuator means, connected to the wheel mounting spindles for controlling the elevation of the sets of vertically movable wheels;

communication connected to the actuator means of the sets of track wheels adapted to lead to and from said fluid-under-pressure supply means;

rotatably pre-set valve means actuated by such movement of certain of the vertically movable wheels and connected in said communication, for controlling the supply of fluid under pressure to and from the actuator means for the sets of vertically movable wheels, tending to maintain the vehicle body level during its movement over irregular terrain;

accumulator chamber means containing compressible gas means, having hydraulic interconnection with the actuator means which is established by a connection to said communication at a point between said valve means and actuator means; and means for setting the rotatable pre-setting of the valve means.

12. The combination of claim 11, further comprising friction means for mechanically locking the wheels at the four corners of the vehicle.

13. In a track-laying vehicle for carrying an instrumentality, having a plurality of vertically movable support means supporting at least one corner of the vehicle body, hydraulic actuators in a set corresponding in number to the support means and interconnecting the body and each of said support means, said actuators being adapted to be connected to a high-pressure fluid and a low-pressure fluid source, and an instrumentality supported on the body of the vehicle for the purpose described:

selectively operable control means for the set of actuators comprising first control means interconnecting the source and the actuators for yieldably resisting vertical movement of said support means and causing the set of actuators to apply a restoring force to the same, said first interconnecting means including accumulators, leveling valving having follower and dictator parts, and further including motion transmitting means responsive to the relative position of the actuators and connected to the follower part of the valving for controlling the flow of fluid through the first interconnecting means;

second means including the dictator part of the leveling valving and manually operable means (96) to set same, and being carried by the vehicle and connected to the first means for causing the first means to induce vertical movement of the support means, whereby the instrumentality on the body is vertically adjusted; and third means carried by said vehicle and connected to certain of said actuators for mechanically locking at least one corner of the body against vertical movement following the vertical adjustment.

14. In a track-laying vehicle for carrying an instrumentality, having pluralities of vertically movable track wheels supporting the vehicle body, sets of hydraulic actuators corresponding to the pluralities of track wheels and interconnecting the body and track wheels for independent movement of the sets of track wheels in a generally vertical direction with respect to the body, said actuators being operable by fluid of a high-pressure and low-pressure source, and an instrumentality supported on the body of the vehicle for the purpose described:

selectively operable control means for the actuators comprising first means hydraulically interconnecting the source and the actuators for yieldably resisting vertical movement of the track wheels and applying a restoring force to the same;

second means carried by the vehicle and connected to the first means for causing the first means to induce vertical movement of selected sets of the support means, whereby the instrumentality on the body may be vertically adjusted, pitched, or tilted; and third means carried by said vehicle and connected to the actuators for mechanically locking the support means against vertical movement after the body is adjusted, pitched, or tilted to the degree desired;

said first means comprising leveling valve means and accumulators hydraulically connected in that order between the source and the actuators, said leveling valve means being mechanically actuated, there being one leveling valve means for each set of actuators, and mechanically connected to one actuator of that set so as to be mechanically actuated for controlling the flow of fluid in the first interconnecting means in response to the relative position of said one actuator.

15. The invention of claim 14,
wherein the leveling valve means each include companion follower and dictator rotor parts connected to said one actuator as aforesaid for mechanical actuation thereby;

said second means comprising operator-operated levers located at a remote control point on the vehicle and connected to said valve rotor parts for causing selected ones of the dictator parts to relatively rotate away from a satisfied position of the companion follower with respect thereto.

16. The invention of claim 15, characterized by said third means comprising friction brakes connected to the actuators at each of the four corners of the vehicle, and having hydraulic cylinders;

said source of fluid being common to the cylinders of the brakes whereby all brakes are frictionally engageable simultaneously.

17. The invention of claim 16,
wherein said brakes comprise rotating, multiple disk brakes, and wherein said actuators comprise rotary, multiple vane fluid actuators.

18. In a multi-wheel vehicle having track wheel suspension means, including load sustaining rotary actuator means, connecting a plurality of track wheels (22) to the vehicle body (26) for sustaining the body in a desired attitude:

shaft members carried by the vehicle, one member (46) of which, with means (30) associated therewith, forms an interconnecting structure in one of said wheel suspension means;

follow-up mechanism carried by the vehicle and connected to a plurality of the shaft members for causing said one shaft member (46) to operate in accordance with a second one (48);

said follow-up mechanism comprising telescopically related valve rotor parts (82, 88), said valve parts being associated with, and connected to different ones of, the shaft members, said valve parts in communication with high and low pressure fluid sources and having fluid-directing grooves and ports therein whereby said parts are effective for selectively applying pressure fluid from the high-pressure source or exhausting pressure fluid to the low-pressure source;

said follow-up mechanism further comprising power means including one rotary actuator (32) in communication with said valve parts and connected to move said one shaft member and the associated valve rotor part (82) to duplicate the motion of, and take a corresponding position to, the second shaft member and its associated rotor part (88), said interconnecting structure (46, 30) formed by the one shaft member and its associated means in said one wheel suspension means interconnecting said rotary actuator and the track wheel of that one suspension means; and track means (24) trained over said track wheel.

19. For use, in carrying upon a transport body, a heavy instrumentality which is to be transported:
(a) a wheeled vehicle of which the vehicle frame is at all times rigid with the body;
(b) sets of front and rear wheels;
(c) lockable hydraulic means individual to the wheels and shiftably and independently connecting the wheels to the frame;
(d) a plurality of yielding devices carried by the vehicle and connected to the lockable hydraulic means for cushioning the latter to afford a springing condition of said means when unlocked;
(e) a plurality of friction lock devices connected to the lockable hydraulic means and locking same for frictionally fixing the attitude of the vehicle relative to ground; and
(f) a unitary locking and unlocking control common to the plurality of lock devices and movable between a position locking the lockable hydraulic means and a position unlocking and restoring said means to the springing condition.

References Cited
UNITED STATES PATENTS

| | | | |
|---|---|---|---|
| 3,246,405 | 4/1966 | Reynolds | 180—9.52 X |
| 3,254,738 | 6/1966 | Larsen | 280—6.11 X |
| 3,262,522 | 7/1966 | Johnson | 180—9.2 X |

LEO FRIAGLIA, *Primary Examiner.*

BENJAMIN HERSH, *Examiner.*

PHILLIP GOODMAN, *Assistant Examiner.*